(No Model.)

J. H. CURRY.
LATHE CHUCK.

No. 353,736. Patented Dec. 7, 1886.

Witnesses:
W. T. Coleman
W. A. Servard

Inventor
James H. Curry
by James M. See
Attorney

UNITED STATES PATENT OFFICE.

JAMES HENRY CURRY, OF WILKINSBURG, PENNSYLVANIA, ASSIGNOR OF TWO-THIRDS TO EDGAR J. BAKER, OF CLEVELAND, AND PERRIN G. MARCH, OF CINCINNATI, OHIO.

LATHE-CHUCK.

SPECIFICATION forming part of Letters Patent No. 353,736, dated December 7, 1886.

Application filed January 30, 1886. Serial No. 190,293. (No model.)

*To all whom it may concern:*

Be it known that I, JAMES HENRY CURRY, of Wilkinsburg, Allegheny county, Pennsylvania, have invented certain new and useful Improvements in Lathe-Chucks, of which the following is a specification.

This invention pertains to improvements in lathe-chucks used by brass-workers and others; and the invention relates particularly to the construction and arrangement of the jaws, as will be readily understood from the following description, taken in connection with the accompanying drawings, in which—

Figure 1:
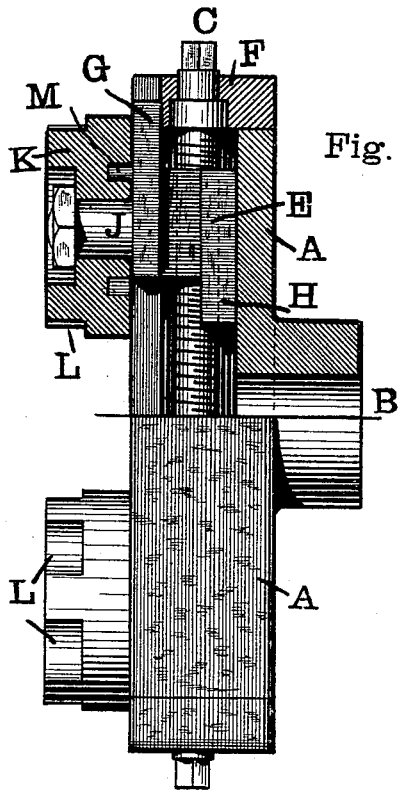
Figure 2:
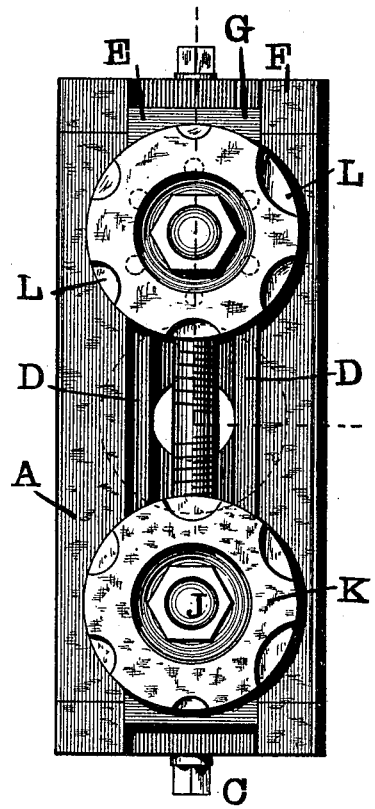
Figure 3:
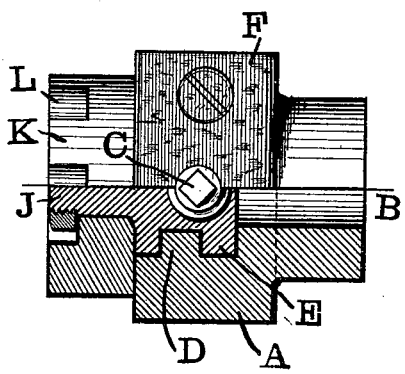

Figure 1 is a side elevation, half longitudinal section, of a lathe-chuck illustrating my invention; Fig. 2, a face view of the same; and Fig. 3, an end elevation, half transverse section, of the same.

In the drawings I have shown my improvements as embodied in a two-jawed universal chuck—that is, both jaws of the chuck are moved simultaneously by a single screw.

The improvements are applicable to chucks with any number of jaws moved by a single screw or otherwise.

In the drawings, A indicates the chuck-body, provided with the usual facial slot to form the slideway for the jaws; B, the hub of the same, adapted to be threaded to fit upon the nose of the lathe-spindle; C, the chuck-screw arranged in the usual manner to move the sliding chuck-jaws; D, the usual side tongues projecting inward from the side walls of the slot to form an under hold for the jaws; E, the jaw-slides fitting the slot of the chuck-body and tapped to form nuts for the chuck-screw; F, the usual caps or screw-bearings at the ends of the slot, these bearings being shown separately formed and held in place by screws; G, outward prolongations of the jaw-slides, serving to lengthen the bearing of the slides in that portion of the slot outside the tongues; H, a similar inward prolongation of the slides to the rear of the tongues; J, cylindrical studs, formed, preferably, integrally with and projecting outwardly from the jaw-slides and provided with end nuts; K, disk-like jaws fitted to revolve upon the studs and to be firmly clamped against the jaw-slides by the nuts upon the studs; L, a circumferential series of work-holding recesses or notches formed in the jaws, and M dowel-pins projecting outwardly from the face of the jaw-slides, and adapted for engagement with any one of the series of dowel-holes formed in the rear face of the jaws.

There are as many dowel-holes as there are notches or recesses in the jaws. By removing the nuts upon the studs the jaws may be pulled outwardly and disengaged from the dowel-pins and then turned until any chosen notch is presented toward the center of the chuck, after which the jaws are clamped firmly against the jaw-slides. The different notches or recesses are to be of a size and shape adapted to suit different characters of work. These notches may be segments of circles adapted to grasp differently-sized pieces, or they may be irregular notches adapted to engage with pieces of special shapes which it is desired to operate on in the lathe; and in some cases the character of the work may require that the notches in the opposing jaws should be of different character.

The prolongations G and H serve to brace the jaw-slides in such a manner as best to meet the working strains upon them without necessitating the lengthening of that portion of the jaw-slide which forms the nut for the chuck-screw.

After the jaws are adjusted rotarily upon their slides into the desired positions the chuck is operated in the usual manner; in other words, after adjusting the jaws rotarily in the manner above described, the jaws are, by means of the screw or screws, or other usual devices by which radial motion is given to them, moved outwardly a sufficient distance to enable the work in hand to be inserted in the chuck between the jaws, after which the jaws are closed down upon the work sufficiently tight to hold the work while it is being operated upon. If the work to be operated upon is of such character (which is quite common) that the chuck-jaws must engage its interior, then the jaws are moved inward sufficiently to enter the work, after which they are moved outwardly to firmly hold the work.

While I illustrate my improvements in connection with a chuck arranged to have the jaws moved coincidentally by means of a right and left hand screw, I contemplate the use of the improvements in connection with chucks whose jaws are arranged to be moved independently by screw or otherwise.

I claim as my invention—

1. In a lathe-chuck, the combination of a jaw-slide, a cylindrical stud projecting therefrom and adapted to clamp the chuck-jaw against the slide, a chuck-jaw provided with a peripheral series of work-receiving recesses or notches and fitted to be revolved upon said stud, and a dowel fitted to maintain the jaw in adjusted relation to the jaw-slide, substantially as and for the purpose set forth.

2. In a lathe-chuck, the combination of a chuck-body provided with a jaw-slot having inwardly-projecting tongues, a jaw-slide fitting said slot and having a longitudinal prolongation bearing in said slot at one side of said tongues, and a chuck-jaw secured to said jaw-slide, substantially as and for the purpose set forth.

3. In a lathe-chuck, the combination of a chuck-body provided with a jaw-slot having inwardly-projecting tongues, and a jaw-slide fitting said slot and having an outward prolongation bearing in said slot in front of said tongues, and an inward prolongation bearing in said slot behind said tongues, and a chuck-jaw secured to said jaw-slide, substantially as and for the purpose set forth.

4. In a lathe-chuck, the combination of chuck-body A, provided with a slot having tongues D, a jaw-slide fitting said slot and having inward and outward prolongations H and G, and a cylindrical stud, J, a chuck-jaw, K, fitted to be revolved upon said stud and provided with a series of notches or recesses, L, and dowel M, substantially as and for the purpose set forth.

JAMES HENRY CURRY.

Witnesses:
JAMES PORTER,
WILLIAM JOHN PORTER.